United States Patent
Liu et al.

(10) Patent No.: US 11,214,229 B2
(45) Date of Patent: Jan. 4, 2022

(54) TABLET, GAS GENERATOR AND GAS GENERATING DEVICE AND MANUFACTURING METHOD THEREOF

(71) Applicant: Hubei Institute of Aerospace Chemical Technology, Xiangyang (CN)

(72) Inventors: Liu Liu, Xiangyang (CN); Juntao Shi, Xiangyang (CN); Shujuan Chen, Xiangyang (CN); Yinming Zhang, Xiangyang (CN); Jun Yao, Xiangyang (CN); Xingkui Wang, Xiangyang (CN); Fan Chen, Xiangyang (CN); Wei Liu, Xiangyang (CN); Xiaoqiang Wang, Xiangyang (CN)

(73) Assignee: Hubei Institute of Aerospace Chemical Technology, Xiangyang (CN)

( * ) Notice: Subject to any disclaimer, the term of this patent is extended or adjusted under 35 U.S.C. 154(b) by 737 days.

(21) Appl. No.: 16/082,381

(22) PCT Filed: Mar. 27, 2018

(86) PCT No.: PCT/CN2018/080713
§ 371 (c)(1),
(2) Date: Sep. 5, 2018

(87) PCT Pub. No.: WO2019/119671
PCT Pub. Date: Jun. 27, 2019

(65) Prior Publication Data
US 2021/0197754 A1    Jul. 1, 2021

(30) Foreign Application Priority Data
Dec. 21, 2017    (CN) .......................... 201711390448.9

(51) Int. Cl.
*B60R 21/264*    (2006.01)

(52) U.S. Cl.
CPC .. *B60R 21/2644* (2013.01); *B60R 2021/2648* (2013.01)

(58) Field of Classification Search
USPC ................................................. 102/530, 531
See application file for complete search history.

(56) References Cited

U.S. PATENT DOCUMENTS

| 4,846,368 A | 7/1989 | Goetz |
| 5,763,820 A | 6/1998 | Philpot et al. |
| (Continued) | | |

FOREIGN PATENT DOCUMENTS

| CN | 102046433 | 5/2011 |
| CN | 105984419 | 10/2016 |
| (Continued) | | |

OTHER PUBLICATIONS

English Abstract of Chinese patents.
(Continued)

*Primary Examiner* — Reginald S Tillman, Jr.
(74) *Attorney, Agent, or Firm* — Hogan Lovells US LLP

(57) ABSTRACT

A tablet, a gas generator and a gas generating device are provided, wherein the tablet comprise a tablet body, the tablet body comprises opposite first and second sides, the tablet body is provided with a vent hole running from the first side to the second side, the first side is provided with a first positioning structure, and the second side is provided with a second positioning structure that cooperates with the first positioning structure. By the smart design of the tablet structure, the present disclosure can effectively simplify the structure of the gas generator and reduce the manufacturing cost.

19 Claims, 6 Drawing Sheets

(56) References Cited

U.S. PATENT DOCUMENTS

| | | | |
|---|---|---|---|
| 6,305,288 B1 | 10/2001 | Nilsson et al. | |
| 8,123,878 B1 | 2/2012 | Krupp et al. | |
| 8,167,334 B2* | 5/2012 | Kratz | B60R 21/2644 |
| | | | 280/736 |
| 8,783,188 B1 | 7/2014 | Mayville et al. | |
| 2010/0194085 A1 | 8/2010 | Mayville et al. | |
| 2011/0018243 A1* | 1/2011 | Yano | B60R 21/272 |
| | | | 280/741 |
| 2012/0125219 A1 | 5/2012 | Mayville et al. | |
| 2013/0134696 A1* | 5/2013 | Mason | B60R 21/264 |
| | | | 280/741 |
| 2014/0230685 A1* | 8/2014 | Hanano | B60R 21/2644 |
| | | | 102/530 |

FOREIGN PATENT DOCUMENTS

| | | |
|---|---|---|
| CN | 205615464 | 10/2016 |
| CN | 205615487 | 10/2016 |
| CN | 106394478 | 2/2017 |
| CN | 106458138 | 2/2017 |
| CN | 107531210 | 1/2018 |
| EP | 2259005 | 8/2010 |
| EP | 3053784 A1 * 8/2016 ........... B60R 21/264 |
| WO | 2006105412 | 10/2006 |
| WO | 2014195650 | 12/2014 |

OTHER PUBLICATIONS

International Search Report and Written Opinion from 2019119671 dated Sep. 28, 2018.
Notification to Grant Patent Right for CN2017113904489.
CN First Office Action from CN2017113904489.
CN Second Office Action from CN2017113904489.
Supplementary Search Report from CN2017113904489.

\* cited by examiner

TABLET, GAS GENERATOR AND GAS GENERATING DEVICE AND MANUFACTURING METHOD THEREOF

CROSS-REFERENCE TO RELATED APPLICATIONS

The present application claims priority to Chinese Patent Application No. 2017113904489, entitled "Tablet, Gas Generator and Gas Generating Device" and filed on Dec. 21, 2017 with the Chinese Patent Office, the entire contents of which are hereby incorporated by reference.

TECHNICAL FIELD

The present disclosure relates to the field of automobile safety technology and, in particular, relates to a tablet, a gas generator and a gas generating device and its manufacturing method.

BACKGROUND ART

Automotive airbags are automotive products belonging to a passive safety technology. In order to provide better protection to the occupants in the event of a traffic accident, and reduce the incidence of personal injury, safety airbag technology is now increasingly used in automobiles, to use airbags to reduce vibration or absorb impact energy in the event of an accident. Airbags are inflated in the moment of an accident and require the use of a gas generator. However, the structure of the existing gas production chamber is complicated, and the overall volume of the gas generator is large, resulting in high cost.

SUMMARY

In view of this, the present disclosure provides a tablet, a gas generator and a gas generating device as well as its manufacturing method, which can effectively solve the above problems.

The present disclosure provides a tablet comprising a tablet body, wherein the tablet body comprises a first side and a second side which are opposite to each other, the tablet body is provided with vent holes running from the first side to the second side, the first side is provided with a first positioning structure, the second side is provided with a second positioning structure that cooperates with the first positioning structure.

Optionally, the first positioning structure is a positioning hole extending from the first side to the second side, and the second positioning structure is a positioning block matched with the positioning hole.

Optionally, there may be a plurality of the vent holes, the first positioning structures, and the second positioning structures.

The present disclosure provides a tablet comprising a tablet body, wherein the tablet body comprises a first side and a second side which are opposite to each other, the tablet body is provided with vent holes running from the first side to the second side, the first side is provided with a first positioning structure, the second side is provided with a second positioning structure that cooperates with the first positioning structure; the first positioning structure is a positioning hole extending from the first side to the second side, the second positioning structure is a positioning block matched with the positioning hole; and the first positioning structure and the second positioning structure are configured such that a plurality of the vent holes of a plurality of the tablets are enabled to communicate with each other to form a passage for gas flowing, with the plurality of the tablets in a stacked state through positioning and cooperating of the first positioning structure and the corresponding second positioning structure, and the peripheries of the plurality of the tablets are located on the same cylindrical surface.

The present disclosure also provides a gas generator comprising a generator body having an accommodating chamber, wherein an ignition chamber for installing an ignition assembly, a gas generating chamber for installing a gas generating assembly and a gas discharging chamber for installing a gas discharging assembly are disposed; the ignition assembly comprises an igniter and a first accommodating groove for placing an ignition tablet, one side of the first accommodating groove near the igniter is provided with first through hole(s), wherein the igniter is located at one end of the generator body, and the first accommodating groove is located between the igniter and the gas generating assembly; the gas generating assembly comprises a second accommodating groove for placing a gas generating tablet and a buffer provided with a plurality of vent holes, wherein the buffer comprises an accommodating chamber with one end opened, and one side of the second accommodating groove close to the first accommodating groove is provided with second through hole(s), the second accommodating groove is located between the first accommodating groove and the buffer, and the buffer is located between the second accommodating groove and the gas discharging assembly, wherein the gas generated by the gas generating assembly flows into the gas discharging chamber after flowing through the accommodating chamber of the buffer from vent holes on the buffer; and the gas discharging assembly comprises a sealing element disposed on the inner wall of the generator body, and a gas-discharging end cover disposed at the other end of the generator body, wherein the gas-discharging end cover is provided with a plurality of gas discharging holes, and the sealing element is located between the buffer and the gas-discharging end cover, and is connected with the inner wall of the generator body.

Optionally, the first accommodating groove and the second accommodating groove are integrally formed.

Optionally, the first accommodating groove and/or the second accommodating groove is provided therein with a plurality of partition plates for dividing the first accommodating groove and/or the second accommodating groove into a plurality of sub accommodating grooves.

Optionally, the gas generating assembly further comprises a first elastic element, wherein the first elastic element is disposed at a side of the first accommodating groove close to the igniter.

Optionally, the side wall of the igniter is provided with a recess, in which a seal ring is installed, and the seal ring is in contact with the inner wall of the generator body.

Optionally, an ignition box with one end opened and a partition plate disposed at the open end of the ignition box are disposed in the first accommodating groove, a buffer chamber is formed between the partition plate and the ignition box, and the ignition box and the partition plate are provided with a plurality of third through holes respectively; and a gap is formed between the ignition box and the inner wall of the generator body, the periphery of the partition plate is connected with the inner wall of the generator body, and the partition plate is located between the igniter and the ignition box.

Optionally, a second elastic element is disposed between the ignition box and the second accommodating groove.

Optionally, an ignited box with one end opened is disposed between the ignition box and the second accommodating groove, and a plurality of fourth through holes are provided at the bottom wall of the ignited box, wherein the open end of the ignited box faces the ignition box, and the bottom wall of the ignited box contacts the second accommodating chamber.

Optionally, the gas generator further comprises a filter screen, and a baffle provided with a plurality of fifth through holes, wherein the baffle is disposed between the sealing element and the filter screen, and the filter screen is located between the buffer and the baffle.

The present disclosure provides a gas generator, comprising a tubular generator body having an accommodating chamber; and an ignition chamber, a gas generating chamber and a gas discharging chamber disposed in the accommodating chamber in sequence, wherein an ignition assembly is installed in the ignition chamber, a gas generating assembly is installed in the gas generating chamber, and a gas discharging assembly is installed in the gas discharging chamber; a first elastic element is elastically supported between the ignition assembly and the gas generating assembly, and the first elastic element is a spring; the ignition assembly comprises an igniter and a first accommodating groove for placing an ignition tablet, a side of the first accommodating groove near the igniter is provided with first through hole(s), wherein the igniter is located at one end of the generator body, and the first accommodating groove is located between the igniter and the gas generating assembly; the gas generating assembly comprises a second accommodating groove for placing a gas generating tablet and a buffer provided with a plurality of vent holes, wherein the buffer comprises an accommodating chamber with one end opened, and one side of the second accommodating groove close to the first accommodating groove is provided with second through hole(s), the second accommodating groove is located between the first accommodating groove and the buffer, and the buffer is located between the second accommodating groove and the gas discharging assembly, wherein the gas generated by the gas generating assembly flows into the gas discharging chamber after flowing through the accommodating chamber of the buffer from vent holes on the buffer; the gas discharging assembly comprises a sealing member disposed on the inner wall of the generator body, and a gas-discharging end cover disposed at the other end of the generator body, the gas-discharging end cover is provided with a plurality of gas discharging holes, and the sealing element is located between the buffer and the gas-discharging end cover, and is connected with the inner wall of the generator body; the gas-discharging end cover is in an inverted cup-shaped structure having an opening toward the generator body, wherein an edge of the opening is radially expanded and sealed to connect to the inner wall of the generator body; and the gas discharging holes are provided at the peripheral wall of the gas-discharging end cover, and each have an outlet facing in a direction perpendicular to the axial direction of the generator body.

Optionally, the generator body is in a cylindrical tubular structure, one end of which, in an axial direction, extends inward to form a narrowed opening (i.e. an opening having a diameter smaller than that of the main body of the cylindrical tubular structure); the diameter of the narrowed opening is smaller than the maximum diameter of the igniter, and greater than the diameter of the tail end of the igniter, and the tail end of the igniter is in fit with at the narrowed opening.

The present disclosure provides a gas generator, comprising a tubular generator body having an accommodating chamber in which an ignition chamber, a gas generating chamber, and a gas discharging chamber are disposed in sequence; wherein an ignition assembly is installed in the ignition chamber, a gas generating assembly is installed in the gas generating chamber, and a gas discharging assembly is installed in the gas discharging chamber; the ignition assembly comprises an igniter and a first accommodating groove for placing an ignition tablet, a side of the first accommodating groove near the igniter is provided with first through hole(s), wherein the igniter is located at one end of the generator body, and the first accommodating groove is located between the igniter and the gas generating assembly; the gas generating assembly comprises a second accommodating groove for placing a gas generating tablet and a buffer provided with a plurality of vent holes, the buffer comprises an accommodating chamber with one end opened, and one side of the second accommodating groove close to the first accommodating groove is provided with second through hole(s), the second accommodating groove is located between the first accommodating groove and the buffer, and the buffer is located between the second accommodating groove and the gas discharging assembly, wherein the gas generated by the gas generating assembly flows into the gas discharging chamber after flowing through the accommodating chamber of the buffer from vent holes on the buffer; the buffer is in a cup-shaped structure comprising a bottom wall and a side peripheral wall and having an opening toward the gas-discharging end cover; the side peripheral wall and the inner wall of the generator body are spaced apart from each other, and the bottom wall and the side peripheral wall of the buffer each are provided with a plurality of the vent holes which are through holes; the gas discharging assembly comprises a sealing element disposed on the inner wall of the generator body, and a gas-discharging end cover disposed at the other end of the generator body, wherein the gas-discharging end cover is provided with a plurality of gas discharging holes, and the sealing element is located between the buffer and the gas-discharging end cover, and is connected with the inner wall of the generator body; the gas-discharging end cover is in an inverted cup-shaped structure, opening of which is toward the generator body, wherein an edge of the opening is radially expanded and sealed to connect to the inner wall of the generator body; the gas discharging holes are provided at the peripheral wall of the gas-discharging end cover, and each have an outlet facing in a direction perpendicular to the axial direction of the generator body; the first accommodating groove is provided therein with an ignition box with one end opened and a partition plate disposed at the open end of the ignition box, and a buffer chamber is formed between the partition plate and the ignition box, the ignition box and the partition plate are provided with a plurality of third through holes respectively; and a second elastic element is elastically supported between the ignition box and the gas generating assembly; and the third through holes located on the partition plate is one-to-one corresponding in position to the third through holes located on the ignition box in the axial direction, and communicate with the ignition chamber and the gas generating chamber.

Optionally, a filter screen is provided between the buffer and the gas-discharging end cover; and a spring, which the gas generating assembly supports thereto, elastically presses the buffer and the filter screen to the gas-discharging end cover.

The present disclosure also provides a gas generating device, comprising the tablets and the gas generator described above, wherein the tablets comprises a plurality of gas generating tablets for generating gas and a plurality of ignition tablets for igniting the gas generating tablets;

the plurality of the ignition tablets are placed in a first accommodating groove in the gas generator, and the plurality of the gas generating tablets are placed in a second accommodating groove in the gas generator.

Optionally, the ignition tablets are each stacked in the first accommodating groove through the cooperation of a first positioning structure and a second positioning structure, and the gas generating tablets are each stacked in the second accommodating groove through the cooperation of a first positioning structure and a second positioning structure.

The present disclosure provides a method of manufacturing a gas generating device, comprising the following steps:

providing a tubular generator body in which an end in an axial direction is narrowed;

placing the ignition assembly into the accommodating chamber of the generator body from the other end of the generator body, and confining the igniter of the ignition assembly axially at the narrowed end; placing the buffer and the gas generating assembly with gas generating tablets; and then welding one gas-discharging end cover to the other end of the generator body, wherein the gas generating assembly and the buffer are elastically pressed, by an elastic element, against the igniter or the gas-discharging end cover fixedly connected with the generator body, and the passage from the igniter to the gas discharging outlet of the gas-discharging end cover is kept clear. The present disclosure provides a tablet, a gas generator, and a gas generating device and its manufacturing method, wherein through the structure design of the tablet and the gas generator, the use of the gas generator can be more convenient, the structure is simpler, and the manufacturing cost is lower.

In addition, the present disclosure can effectively ensure that the gas generated in the gas generator quickly enters the airbag, through the vent holes disposed on the tablet, thereby improving safety. Meanwhile, it can effectively improve the utilization rate of the tablets.

BRIEF DESCRIPTION OF DRAWINGS

To more clearly illustrate the technical solutions of the embodiments of the present disclosure, the figures used in the embodiments will be briefly described below. It should be understood that the following figures only show some embodiments of the present disclosure, and therefore should not be regarded as a limitation of the scope, for those skilled in the art, other related figures may also be obtained based on these figures without any creative work.

Figure 1:
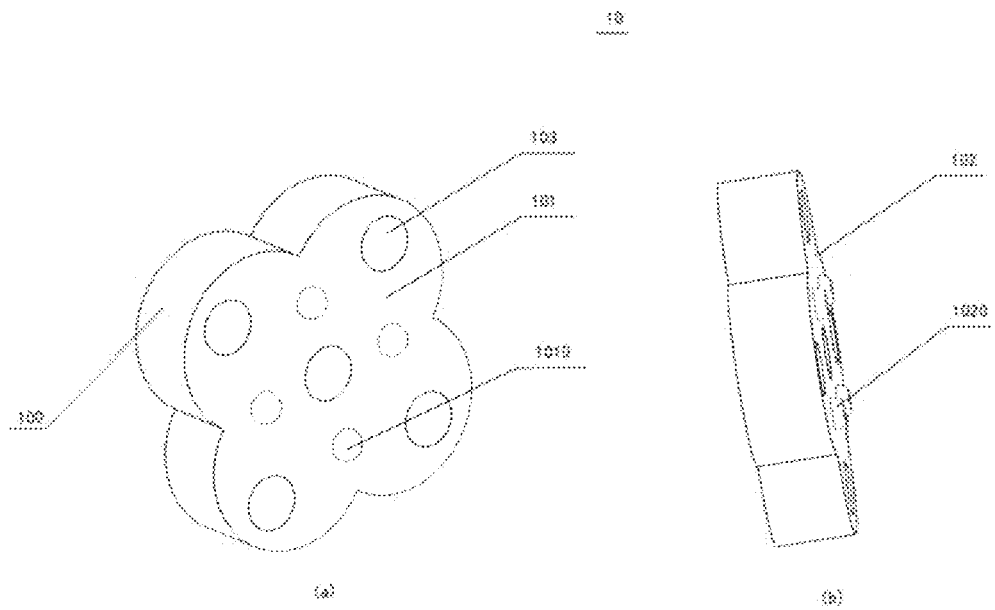
FIG. 1 is a schematic structural view of a tablet provided by the present disclosure.

Reference signs: 10—tablet; 100—tablet body; 101—first side; 1010—first positioning structure; 102—second side; 1020—second positioning structure; 103—vent hole; 20—gas generator; 21—generator body; 22—ignition chamber; 220—igniter; 2200—recess; 2201—seal ring; 221—first accommodating groove; 2210—first through hole; 2211—ignition box; 2212—partition plate; 2123—third through hole; 2214—ignited box; 2215—fourth through hole; 23—gas generating chamber; 230—second accommodating groove; 2300—second through hole; 231—buffer; 232—filter screen; 233—baffle; 234—fifth through hole; 24—gas discharging chamber; 240—sealing element; 241—gas-discharging end cover; 242—gas discharging hole; 25—first elastic element; 26—second elastic element; 27—vent hole; 30—ignition composition; 40—ignited composition.

DETAILED DESCRIPTION OF EMBODIMENTS

The following clearly describes the technical solutions in the present disclosure with reference to the accompanying figures, obviously, the described embodiments are some but not all of the examples of the present disclosure. The assembly of the embodiments, which are generally described and illustrated in the figures herein, may be arranged and designed in a variety of different configurations.

Thus, the following detailed description of the embodiments provided in the figures is not intended to limit the scope of the claimed disclosure. Based on the embodiments, all other embodiments, obtained by those skilled in the art without any creative work, fall within the protection scope of the present disclosure.

It should be noted that similar reference numerals and letters refer to similar items in the following figures, so that once an item is defined in one figure, it need not be further defined and explained in subsequent figures. In the disclosure, the terms "first, second, third, fourth, etc." are used only to distinguish one from another, and are not to be construed as merely referring to or implying importance in relativity.

In the description of the present disclosure, the terms "disposed", "connected", and "communicated" are to be interpreted broadly unless specifically defined and defined otherwise. It may be, for example, a fixed connection or a detachable connection, or integral connection, or may be mechanical connection or electrical connection; or it may be direct connection or indirect connection through intermediate media, and may be internal communication of two elements. For a person skilled in the art, the specific meanings of the above terms in the present disclosure can be understood in specific situations.

In the existing automobiles, air generating devices are usually used to complete the instantaneous inflation of the airbags to avoid safety accidents, however, the inventors found that in the existing gas generating devices, the gas discharging passages are generally provided in the middle of a plurality of gas generating tablets, or the gas discharging passages of the gas generating device surround the gas generating tablets, which causes a problem of complex structures, large volumes, and high costs of the gas generating device. Based on this, the present disclosure provides the following technical solutions to alleviate the above problems.

The present disclosure provides a gas generating device, comprising the tablets 10 and the gas generator 20, wherein the tablets 10 comprise a plurality of gas generating tablets for generating gas and a plurality of ignition tablets for igniting the gas generating tablets. The plurality of the ignition tablets are placed in a first accommodating groove 221 in the gas generator 20, and the plurality of the gas generating tablets are placed in a second accommodating groove 230 in the gas generator 20. It should be understood here that the structure of the gas generating tablet and the structure of the ignition tablet may be same or different, which is not limited herein in the disclosure.

In the above, the gas generating device provided in the present disclosure will be described as follows by several embodiments, wherein, tablets 10 and gas generators 20 are comprised.

Embodiment One

In the present embodiment, as shown in FIG. 1, it is a schematic structural view of a tablet 10 used in the gas generating device provided in the present disclosure, and the tablet 10 may be but is not limited to gas generating tablets or ignition tablets and the like. In the above, the tablet 10 comprises a tablet body 100, the tablet body 100 comprises a first side 101 and a second side 102 which are opposite to each other, the tablet body 100 is provided with vent holes 103 running from the first side 101 to the second side 102, the first side 101 is provided with first positioning structures 1010, and the second side 102 is provided with second positioning structures 1020 that cooperate with the first positioning structures 1010. Optionally, the shape of the tablet body 100 may be flexibly designed according to actual conditions, for example, the tablet body 100 may be in a shape of a square, a cylinder, or a petal as shown in FIG. 1, which is not limited herein in the embodiment.

In the present embodiment one, the vent holes 103 are used for the flowing of gas or ignition energy, and the shapes and distribution positions thereof may be flexibly designed according to actual needs. For example, the vent holes 103 may be in number of 5 as shown in FIG. 1, and are uniformly distributed on the tablet body 100, and the like, which is not limited herein in present embodiment.

In the present embodiment one, the cooperation of the first positioning structure 1010 and the second positioning structure 1020 can realize the stacking of multiple tablets 10, and the individual tablets 10 together form a passage for flowing of gas and the like. In practical implementation, the first positioning structure 1010 and the second positioning structure 1020 may have multiple cooperation approaches, for example, the first positioning structure 1010 and the second positioning structure 1020 may be connected by embedding, or may also be connected by misalignment of positioning structures, etc.

Figure 2:
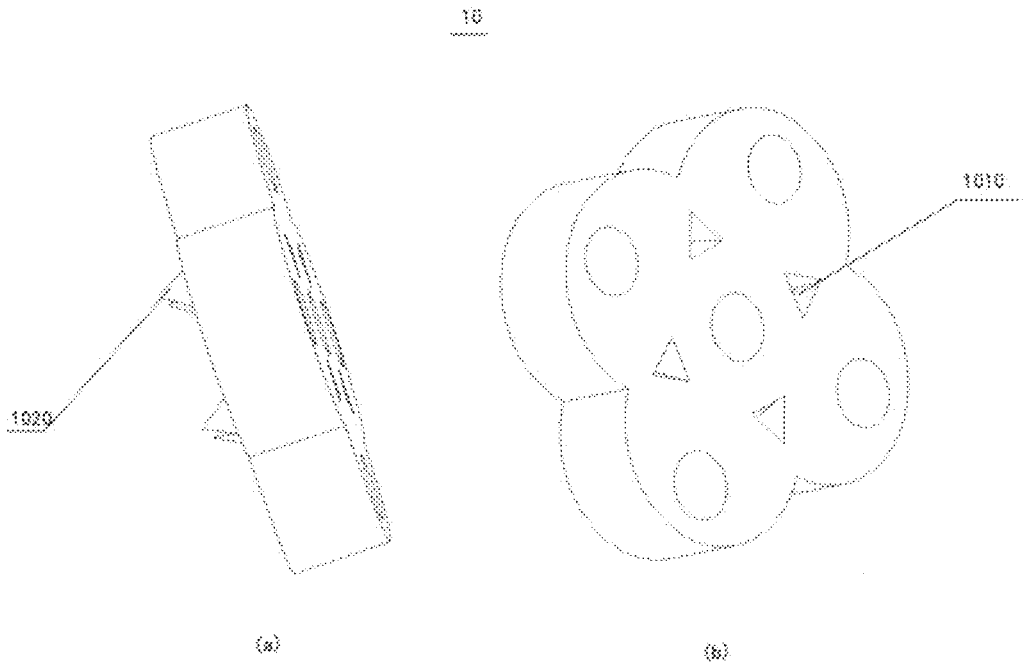
FIG. 2 is another schematic structural view of a tablet of the present disclosure.

Optionally, when the first positioning structure 1010 and the second positioning structure 1020 are connected by embedding, the first positioning structure 1010 may be a positioning hole extending from the first side 101 to the second side 102, the second positioning structure 1020 may be a positioning block matched with the positioning hole. For example, as shown in FIG. 1 and FIG. 2, when the positioning hole may be a circular hole, the positioning block cooperated with the circular positioning hole may be in a shape of circular truncated cone; and when the positioning hole is a triangular hole, the positioning block cooperated with the triangular positioning hole may be a cone or the like, which is not limited in the present embodiment.

Figure 3:
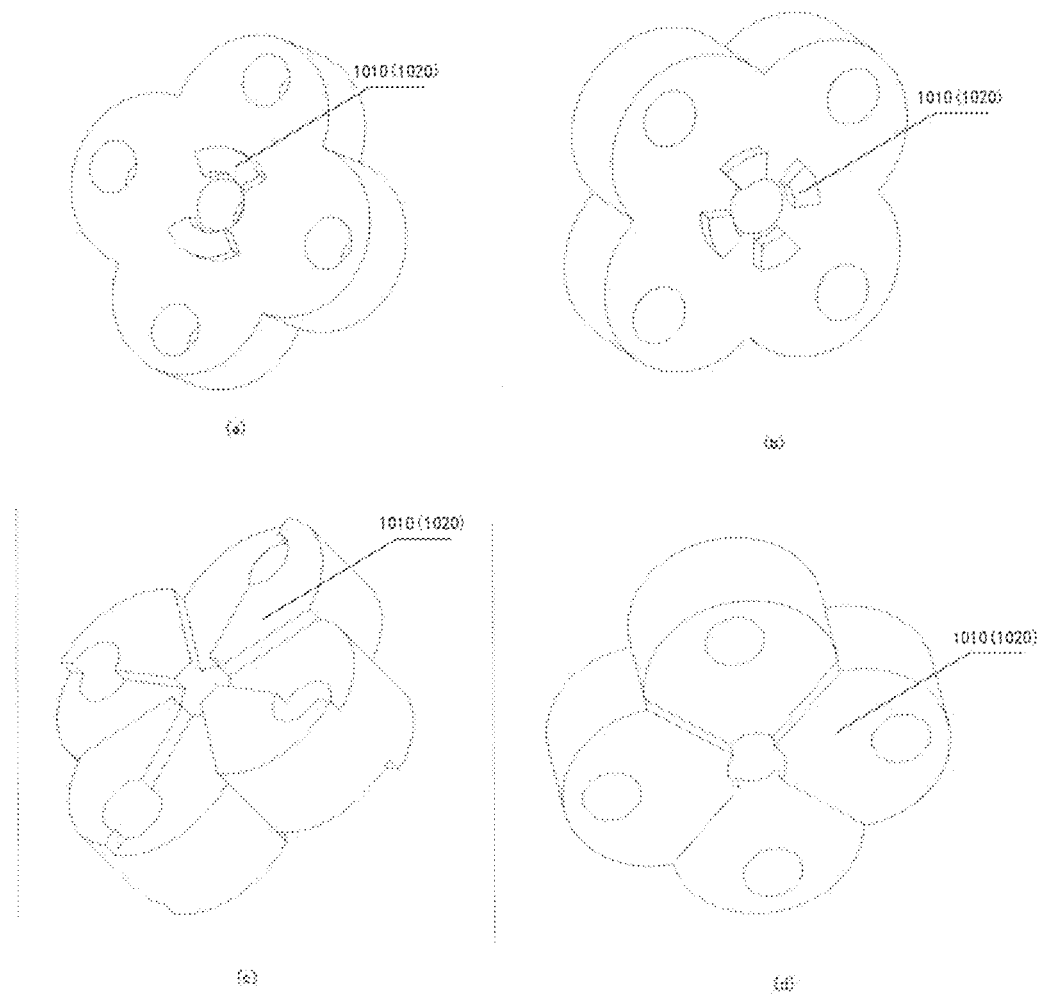
FIG. 3 is a further schematic structural view of a tablet of the present disclosure.

When the first positioning structure 1010 and the second positioning structure 1020 are connected by misalignment of positioning structures, the shape and the size of the first positioning structure 1010 may be the same as the shape and the size of the second positioning structure 1020, both the first positioning structure 1010 and the second positioning structure 1020 may be positioning blocks of the same shape, the positioning blocks on different tablets 10 may be clamped by each other through the misalignment, as shown in FIG. 3, it should be understood here that when the positioning structures are connected by means of misalignment, the structure of the tablet 10 may be, but not limited to, that shown in FIG. 3.

In addition, in the embodiment one, regarding to one tablet 10, the quantity of the first positioning structure 1010 and the second positioning structure 1020 can be flexibly designed according to actual conditions, which is not limited in the present embodiment.

Figure 4:
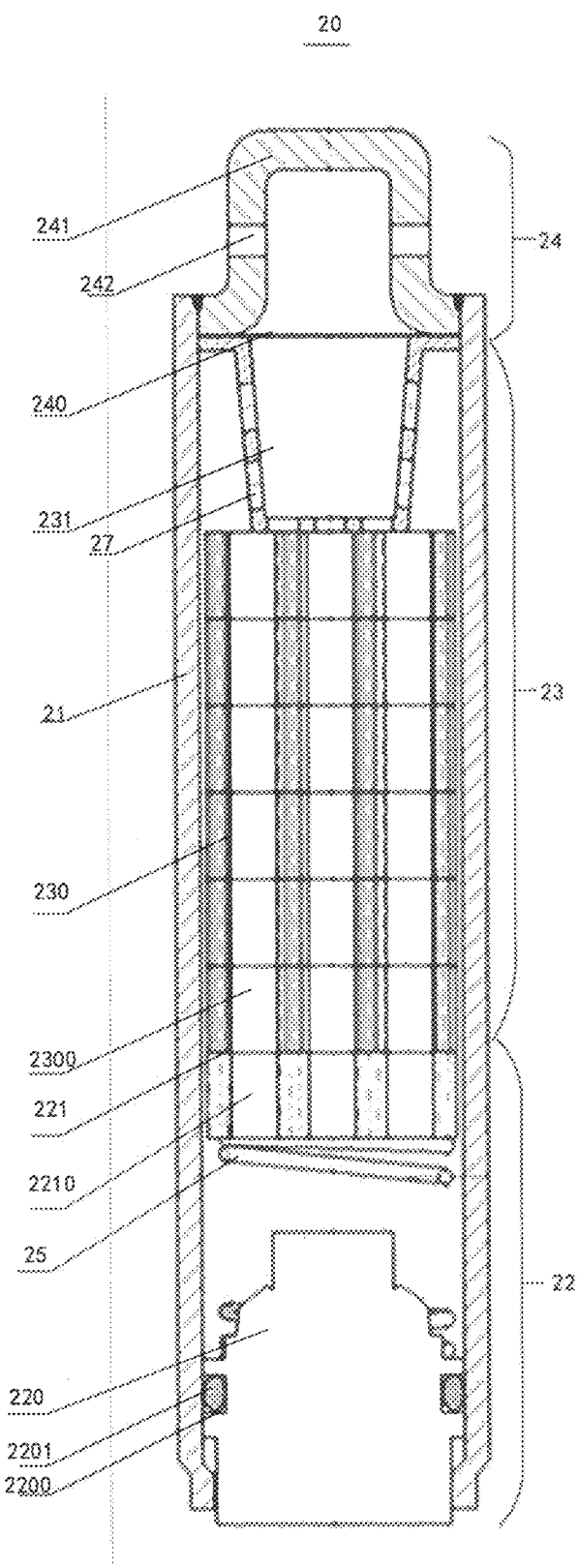
FIG. 4 is a sectional view of a gas generator provided by Embodiment one of the present disclosure.

The gas generator 20 is used to carry the tablet 10, such as ignition tablet or gas generating tablet. As shown in FIG. 4, the gas generator 20 comprises a generator body 21 having an accommodating chamber in which an ignition chamber 22 for installing an ignition assembly, a gas generating chamber 23 for installing a gas generating assembly, and a gas discharging chamber 24 for installing a gas discharging assembly are disposed in sequence. In the above, the shape of the generator body 21 can be flexibly designed according to actual requirements, for example, the generator body 21 can be, but not limited to, in a tubular structure and the like.

The ignition assembly comprises an igniter 220 and a first accommodating groove 221 for placing the ignition tablet, and a side of the accommodating groove near the igniter 220 is provided with a first through hole 2210, wherein the igniter 220 is located at one end of the generator body 21, the first accommodating groove 221 is located between the igniter 220 and the gas generating assembly. It should be understood that the first through hole 2210 is used for the delivery of gas or ignition energy, the shape, size, and quantity of the first through hole are not limited herein. Optionally, the generator body 21 is in a cylindrical tubular structure, one end of which, in an axial direction, extends inward to form a narrowed opening, wherein the diameter of the narrowed opening is smaller than the maximum diameter of the igniter 220, and greater than the diameter of the tail end of the igniter 220, and the tail end of the igniter 220 is in fit with the narrowed opening.

Optionally, the first accommodating groove 221 is provided with a plurality of partition plates 2212 for dividing the first accommodating groove 221 and/or the second accommodating groove 230 into a plurality of sub accommodating grooves. In practical implementation, a plurality of the ignition tablets may be stacked in the sub accommodation groove by cooperation of the first positioning structure 1010 and the second positioning structure 1020. In the above, through the arrangement of a plurality of sub accommodation grooves, the ignition tablets can be conveniently installed, and the vent holes 103 on the plurality of ignition tablets form a gas discharging passage.

Optionally, the gas generating assembly further comprises a first elastic element 25, the first elastic element 25 is disposed at a side of the first accommodating groove 221 close to the igniter 220, the first elastic element 25 is used for delivering ignition energy in the first accommodating groove 221 to the ignition tablet through the first through hole 2210 under the pressure of the igniter 220, so as to ignite the ignition tablet. Optionally, the first elastic element 25 may be, but is not limited to, a spring, a rubber and the like, which is not limited in the present embodiment.

Optionally, the side wall of the igniter 220 is further provided with a recess 2200, in which a seal ring 2201 is installed, wherein the seal ring 2201 is in contact with the inner wall of the generator body 21. In the above, the recess 2200 may be an annular recess 2200, and the seal ring 2201 is installed in the annular recess 2200, for sealing the gas generator 20. In practical implementation, the seal ring 2201 may be coated with a certain amount of lubricant, so that the igniter 220 is more smoothly pressed into the generator body 21 under the stress of the external pressure.

The gas generating assembly comprises a second accommodating groove 230 for placing a gas generating tablet and a buffer 231 provided with a plurality of vent holes 103, wherein the buffer 231 comprises an accommodating chamber with one end opened, and one side of the second accommodating groove 230 close to the first accommodating groove 221 is provided with a second through hole 2300, the second accommodating groove 230 is located between the first accommodating groove 221 and the buffer 231, and the buffer 231 is located between the second accommodating groove 230 and the gas discharging assembly, wherein the gas generated by the gas generating assembly flows into the gas discharging chamber 24 after flowing through the accommodating chamber of the buffer 231 from multiple vent holes 103 on the buffer 231. It should be understood that the second through hole 2300 is used for the delivery of gas or ignition energy, the shape, size, and quantity of which are not limited herein. In the above, regarding the structure of the second accommodating groove 230, reference may be made to the description of the first accommodating groove 221, which will not be repeated in the present embodiment. In addition, the first accommodating groove 221 and the second accommodating groove 230 may be separately disposed, or may be integrally formed, and the first accommodating groove 221 and the second accommodating groove 230 may communicate through the first through holes 2210 and the second through holes 2300 located thereon. The structure of the buffer 231 can be disposed such that the buffer 231 is in a cup-shaped structure comprising a bottom wall and a side peripheral wall and having an opening toward the gas-discharging end cover 241; the inner wall of the generator body 21 and the side peripheral wall are spaced apart from each other; and both of the bottom wall and the side peripheral wall of the buffer 231 is provided with a plurality of the vent holes which are through.

Optionally, the gas discharging assembly comprises a sealing element 240 disposed on the inner wall of the generator body 21 and an gas-discharging end cover 241 disposed on the other end of the generator body 21, wherein the gas-discharging end cover 241 is provided with a plurality of gas discharging holes 242, the sealing element 240 is located between the buffer 231 and the gas-discharging end cover 241, and is connected to the inner wall of the generator body 21. In the above, optionally, the gas-discharging end cover 241 may be in an inverted cup-shaped structure, opening of which is toward the generator body 21, wherein the edge of the opening is radially expanded and sealed to connect to the inner wall of the generator body 21; the gas discharging holes 242 are provided at the peripheral wall of the gas-discharging end cover 241, and each have an outlet facing in a direction perpendicular to the axial direction of the generator body 21.

In the above, the gas-discharging end cover 241 can be disposed on the generator body 21 by welding, and the weld joint formed during welding together with the sealing element 240 achieves the sealing of the gas generator 20. During use, the gas-discharging end cover 241 can be displaced into the generator body 21 under stress of the external pressure, to break through the sealing element 240, so that the gas in the buffer 231 enters the airbag through the gas-discharging end cover 241.

Optionally, the axis of the gas-discharging end cover 241 may be perpendicular to the axis of the generator body 21.

Embodiment Two

Figure 5:
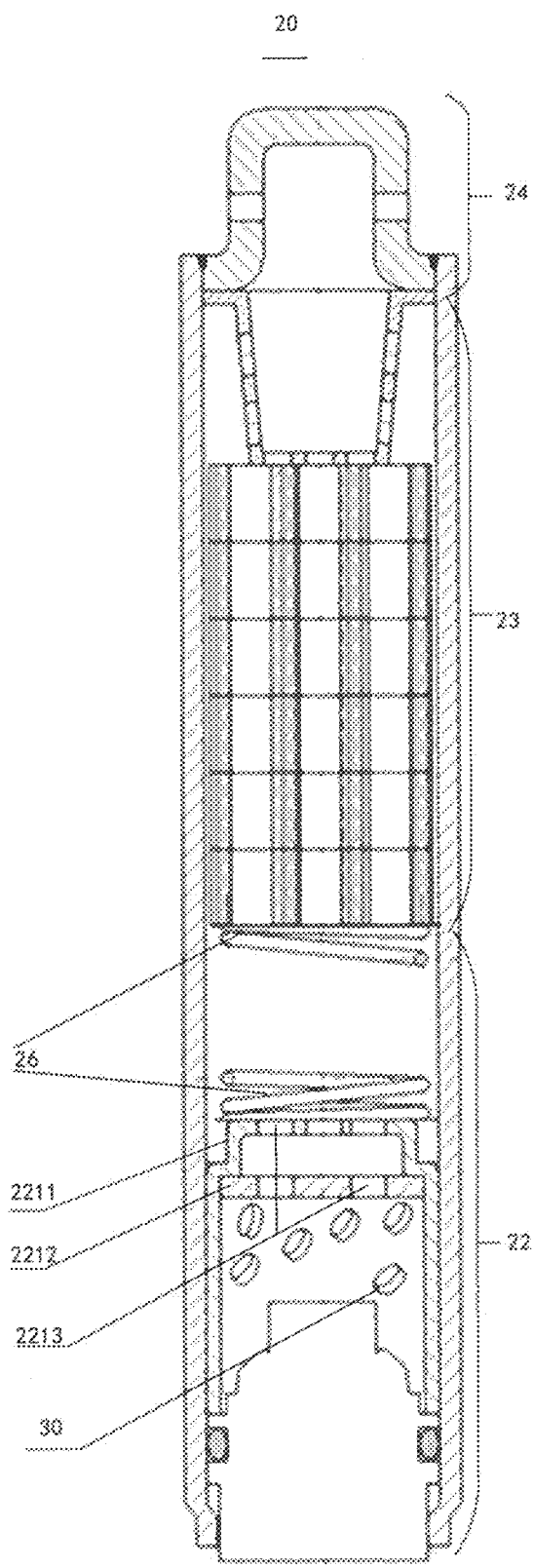
FIG. 5 is a sectional view of a gas generator provided by Embodiment two of the present disclosure.

The present embodiment two is obtained by improvement based on the embodiment one. As shown in FIG. 5, in the present embodiment two, the difference from the embodiment one is that an ignition box 2211 with one end opened and a partition plate 2212 disposed at the open end of the ignition box 2211 are disposed in the first accommodating groove 221, and a buffer chamber is formed between the partition plate 2212 and the ignition box 2211, the ignition box 2211 and the partition plate 2212 are each provided thereon with a plurality of third through holes 2213, wherein, there is a gap between the ignition box 2211 and the inner wall of the generator body 21, the periphery of the partition plate 2212 is connected with the inner wall of the generator body 21, and the partition plate 2212 is located between the igniter 220 and the ignition box 2211. Optionally, the third through holes 2213 located on the partition plates 2212 may be one-to-one corresponding in position to the third through holes 2212 located on the ignition box 2211.

In practical implementation, the ignition composition 30 may be placed in the accommodating space defined by the partition plate 2212, the igniter 220 and the inner wall of the generator body 21. The ignition composition 30 is ignited by the igniter 220, and the ignition composition 30 is not in direct contact with the gas generating tablet. The buffer chamber is used for buffering and accumulating the ignition energy generated by the ignition composition, thereby forming more powerful ignition energy to ignite the gas generating tablet, therefore greatly improving the combustion consistency and combustion efficiency of the gas generating tablet. It should be understood here that the volume of the ignition composition 30 is smaller than that of the ignition tablet, while the material of the ignition composition may be the same as or different from that of the ignition tablet, which is not limited in the present embodiment.

Optionally, there is a second elastic element 26, such as a cylindrical compression spring and the like, between the ignition box 2211 and the second accommodating groove 230. During the use of the gas generating device, the second elastic element 26 is in contact with the gas generating tablet, and the second elastic element 26 is concentric with the gas generating tablet. In addition, the axial positioning of the ignition box 2211 and the generator body 21 is implemented by interference (amount of interference) between the outer diameter of the ignition box 2211 and the inner diameter of the generator body 21.

Embodiment Three

Figure 6:
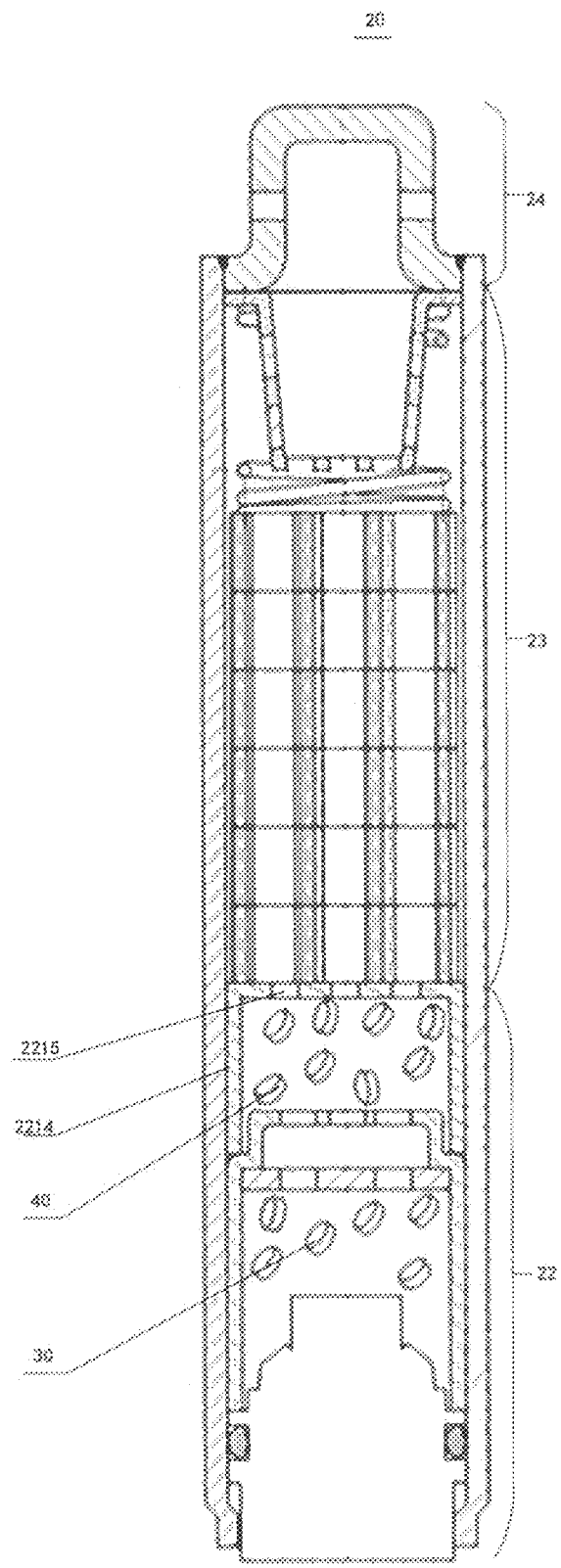
FIG. 6 is a sectional view of a gas generator provided by Embodiment three of the present disclosure.

As shown in FIG. 6, the difference between the present embodiment three and the embodiment two is that an ignited box 2214 with one end opened is disposed between the ignition box 2211 and the second accommodating groove 230, the bottom wall of the ignited box 2214 is provided with a fourth through hole 2215, wherein the open end of the ignited box 2214 is toward the ignition box 2211, and the bottom wall is in contact with the second accommodating groove 230. Optionally, there may be multiple fourth through holes 2215, and the shape of the fourth through hole 2215 is not limited herein, such as a circle, a triangle and the like.

In practical implementation, the ignited composition 40 is placed in the ignited chamber defined by the ignited box 2214 and the ignition box 2211, so as to increase the combustion efficiency when the gas generating tablet is difficult to ignite. In addition, the axial positioning of the ignited box 2214 and the generator body 21 is implemented by interference between the outer diameter of the ignited box 2214 and the inner diameter of the generator body 21.

Embodiment Four

Figure 7:
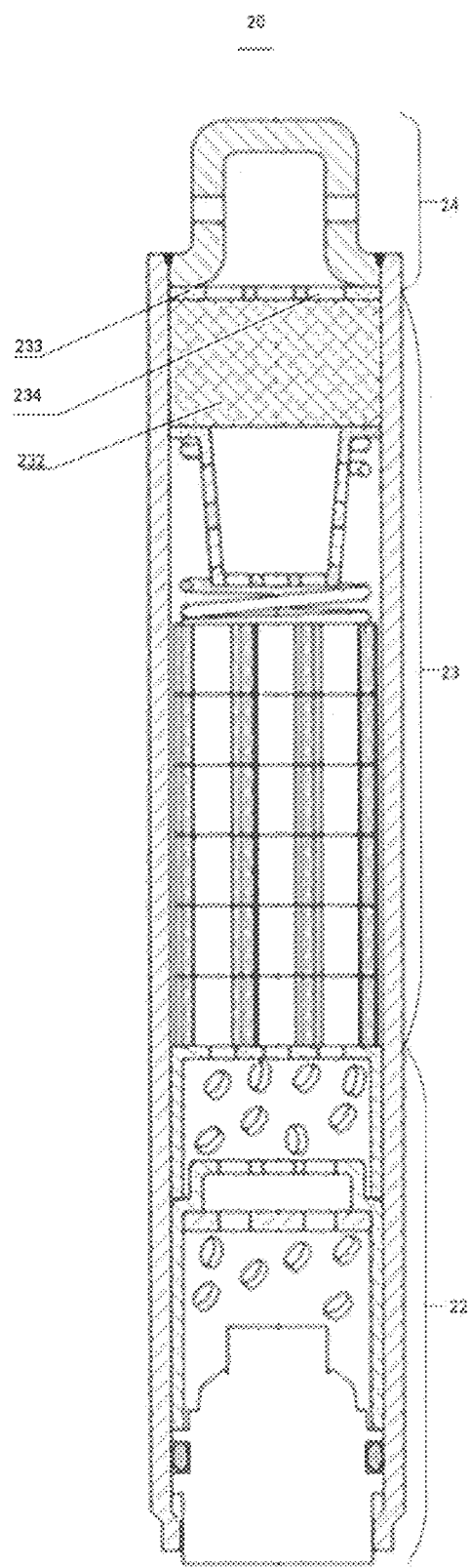
FIG. 7 is a sectional view of a gas generator provided by Embodiment four of the present disclosure.

As shown in FIG. 7, the difference between the present embodiment four and the embodiment three is that: the gas generator 20 further comprises a filter screen 232, and a baffle 233 provided with a plurality of fifth through holes 234, wherein the baffle 233 is disposed between the sealing element 240 and the filter screen 232, the filter screen 232 is located between the buffer 231 and the baffle 233, wherein, the filter screen 232 is used for filtering out the residue in the gas generated in the gas generating device.

Optionally, based on the design and description of the embodiment one to the embodiment four described above, the working principle of the gas generating device will be described below.

(1) When a collision occurs to an automobile or the like, if the acceleration generated due to the collision reaches or exceeds a preset limit value of the airbag controller, the airbag controller sends out an ignition signal and activates the igniter 220 in the generator body 21.

(2) The ignition energy generated by the igniter 220 ignites the ignition tablet (or ignition composition 30) located in the first accommodating groove 221, and then the ignition energy generated by the ignition tablet (or ignition composition 30), passes through the third through holes 2213 on the partition plate 2212, is buffered and accumulated by the buffer chamber, and then is uniformly delivered into the ignited chamber constructed by the ignition box 2211 and the ignited box 2214 through the third through holes 2213 of the ignition box 2211, to ignite the ignited composition 40.

(3) The ignition energy generated by the igniter 220, ignition tablet and ignited composition 40 is delivered to the second accommodating groove 230 through bottom through holes of the ignited box 2214, and sequentially ignites the gas generating tablets located in the second accommodating groove 230, to generate a large amount of gas.

(4) A large amount of gas flows through the gas discharging passages formed by the individual gas generating tablets themselves to the buffer 231, and enters through the vent holes 103 on the buffer 231 into the accommodating chamber thereof to form a high pressure, wherein the pressure of the gas in the accommodating chamber can reach 40 Mpa.

(5) After filtered by the filter 232 and cooled, the high-pressure gas in the accommodating chamber of the buffer 231 flows from the fifth through holes 234 on the baffle 233 to the sealing element 240 and enters the gas-discharging end cover 241, and finally enters the airbag of the safety airbag system through the gas discharging holes 242 of the gas-discharging end cover 241, so that the airbag is inflated and expanded, thereby providing a safety protection to the occupant.

It should be understood herein that in each of the gas generating devices described in the embodiment one to the embodiment four, the working principle of each gas generating device can be adjusted according to its structure, and the embodiments will not be repeated herein.

The foregoing method of manufacturing a gas generating device may comprises the following steps:

providing a tubular generator body 21 in which an end in an axial direction is narrowed;

placing the ignition assembly into the accommodating chamber of the generator body 21 from the other end of the generator body 21, and confining the igniter 220 of the ignition assembly axially to the narrowed end; placing the buffer 231 and the gas generating assembly with gas generating tablets therein in sequence; and then welding one gas-discharging end cover 241 to the other end of the generator body 21, wherein the gas generating assembly and the buffer 231 are elastically pressed through an elastic element against the igniter 220 or the gas-discharging end cover 241 fixedly connected to the generator body 21, and the passage from the igniter 220 to the gas discharging outlet 242 of the gas-discharging end cover 241 is kept clear.

In the manufacturing method, the igniter 220 is fixedly limited at the narrowed end of the generator body 21, and the gas-discharging end cover 241 is welded to the other end of the generator body 21, between both of which other structures such as a gas generating assembly and the like are installed. In order to stabilize the positions of each of the components installed in the generator body 21, the generator body 21 is further provided therein with an elastic element, so that each of the components therein are elastically pressed against the igniter 220 or the gas-discharging end cover 241, achieving an axial elastic limiting. In summary, the present disclosure provides a tablet 10, a gas generator 20, and a gas generating device and its manufacturing method, wherein the use of the gas generator 20 can be more convenient, the structure is simpler, and the manufacturing cost is lower by designing the structure of the tablet 10 and the gas generator 20.

In addition, the present disclosure can effectively ensure that the gas generated in the gas generator 20 quickly enters the airbag through the vent holes 103 disposed on the tablet 10, thereby improving safety. Meanwhile, it can effectively increase the utilization rate of the tablets 10.

The foregoing descriptions are merely preferred embodiments of the present disclosure and are not intended to limit the present disclosure. For those skilled in the art, the present disclosure may have various changes and modifications. Any modification, equivalent replacement, or improvement made within the spirit and principle of the present disclosure shall fall within the protection scope of the present disclosure.

INDUSTRIAL APPLICABILITY

The present disclosure provides a tablet 10, a gas generator 20, and a gas generating device and its manufacturing method, wherein the use of the gas generator 20 can be more convenient, the structure is simpler, and the manufacturing cost is lower by designing the structure of the tablet 10 and the gas generator 20.

The invention claimed is:

1. A gas generator, comprising a generator body having an accommodating chamber, wherein an ignition chamber configured for installing an ignition assembly, a gas generating chamber configured for installing a gas generating assembly, and a gas discharging chamber configured for installing an gas discharging assembly are disposed in sequence in the accommodating chamber;

the ignition assembly comprises an igniter and a first accommodating groove configured for placing the ignition tablet, a side of the first accommodating groove near the igniter is provided with a first through hole, wherein the igniter is located at one end of the generator body, and the first accommodating groove is located between the igniter and the gas generating assembly;

the gas generating assembly comprises a second accommodating groove configured for placing a gas generating tablet and a buffer provided with a plurality of vent holes, the buffer comprises an accommodating chamber with one end opened, and one side of the second accommodating groove close to the first accommodating groove is provided with a second through hole, the second accommodating groove is located between the first accommodating groove and the buffer, and the buffer is located between the second accommodating groove and the gas discharging assembly, wherein gas generated by the gas generating assembly flows into the gas discharging chamber after flowing through the accommodating chamber of the buffer from the vent holes on the buffer; and the gas discharging assembly comprises a sealing element disposed on an inner wall of the generator body, and a gas-discharging end cover disposed at the other end of the generator body, the gas-discharging end cover is provided with a plurality of gas discharging holes, and the sealing element is located between the buffer and the gas-discharging end cover, and is connected with the inner wall of the generator body.

2. The gas generator of claim 1, wherein the first accommodating groove and the second accommodating groove are integrally formed.

3. The gas generator of claim 1, wherein the first accommodating groove and/or the second accommodating groove are provided with a plurality of partition plates configured for dividing the first accommodating groove and/or the second accommodating groove into a plurality of sub accommodating grooves.

4. The gas generator of claim 2, wherein the gas generating assembly further comprises a first elastic element, and the first elastic element is disposed at a side of the first accommodating groove close to the igniter.

5. The gas generator of claim 2, wherein a side wall of the igniter is provided with a recess in which a seal ring is installed, and the seal ring is in contact with the inner wall of the generator body.

6. The gas generator of claim 1, wherein an ignition box with one end opened and a partition plate disposed at the open end of the ignition box are disposed in the first accommodating groove, a buffer chamber is formed between the partition plate and the ignition box, and the ignition box and the partition plate are each provided with a plurality of third through holes; and a gap is formed between the ignition box and the inner wall of the generator body, a periphery of the partition plate is connected with the inner wall of the generator body, and the partition plate is located between the igniter and the ignition box.

7. The gas generator of claim 6, wherein a second elastic element is disposed between the ignition box and the second accommodating groove.

8. The gas generator of claim 7, wherein an ignited box with one end opened is disposed between the ignition box and the second accommodating groove, and a bottom wall of the ignited box is provided with a plurality of fourth through holes, wherein the open end of the ignited box is toward the ignition box, and the bottom wall of the ignited box contacts the second accommodating chamber.

9. The gas generator of claim 1, wherein the gas generator further comprises a filter screen and a baffle provided with a plurality of fifth through holes, the baffle is disposed between the sealing element and the filter screen, and the filter screen is located between the buffer and the baffle.

10. The gas generator of claim 1, wherein the generator body is tubular;

an ignition assembly is installed in the ignition chamber, a gas generating assembly is installed in the gas generating chamber, and a gas discharging assembly is installed in the gas discharging chamber;

a first elastic element is elastically supported between the ignition assembly and the gas generating assembly, and the first elastic element is a spring; and the gas-discharging end cover is in an inverted cup-shaped structure, an opening of which is toward the generator body, wherein an edge of the opening is radially expanded and sealed to connect to the inner wall of the generator body, and the gas discharging holes are provided at a peripheral wall of the gas-discharging end cover, and each have an outlet facing in a direction perpendicular to an axial direction of the generator body.

11. The gas generator of claim 10, wherein the generator body is in a cylindrical tubular structure, one end of which, in an axial direction, extends inward to form a narrowed opening; a diameter of the narrowed opening is smaller than a maximum diameter of the igniter, and greater than a diameter of a tail end of the igniter, wherein the tail end of the igniter is in fit with the narrowed opening.

12. The gas generator of claim 1, wherein the tubular generator body is tubular;

an ignition assembly is installed in the ignition chamber, a gas generating assembly is installed in the gas generating chamber, and a gas discharging assembly is installed in the gas discharging chamber;

the buffer is in a cup-shaped structure comprising a bottom wall and a side peripheral wall and having an opening toward the gas-discharging end cover, wherein the inner wall of the generator body and the side peripheral wall are spaced apart from each other, and the bottom wall and the side peripheral wall of the buffer are each provided thereon with a plurality of the vent holes which are through holes;

the gas-discharging end cover is in an inverted cup-shaped structure having an opening toward the generator body, wherein an edge of the opening is radially expanded and sealed to connect to the inner wall of the generator body, and the gas discharging holes are provided at a peripheral wall of the gas-discharging end cover, and each have an outlet facing in a direction perpendicular to an axial direction of the generator body; an ignition box with one end opened and a partition plate disposed at the open end of the ignition box are disposed in the first accommodating groove, a buffer chamber is defined by the partition plate and the ignition box, the ignition box and the partition plate are each provided with a plurality of third through holes, and a second elastic element is elastically supported between the ignition box and the gas generating assembly; and the third through holes located on the partition plate are one-to-one corresponding in position to the third through holes located on the ignition box in the axial direction, and communicate with the ignition chamber and the gas generating chamber.

13. The gas generator of claim 12, wherein a filter screen is provided between the buffer and the gas-discharging end cover; a spring, which the gas generating assembly supports, elastically presses the buffer and the filter screen to the gas-discharging end cover.

14. A gas generating device, comprising tablets and the gas generator of claim 1, wherein each tablet comprises a tablet body, wherein the tablet body comprises a first side and a second side which are opposite to each other, the tablet body is provided with a vent hole running from the first side to the second side, the first side is provided with a first positioning structure, and the second side is provided with a second positioning structure that cooperates with the first positioning structure;
the tablets comprise a plurality of gas generating tablets configured for generating gas and a plurality of ignition tablets configured for igniting the gas generating tablets; and
the plurality of the ignition tablets are placed in the first accommodating groove in the gas generator, and the plurality of the gas generating tablets are placed in the second accommodating groove in the gas generator.

15. The gas generating device of claim 14, wherein the first positioning structure is a positioning hole extending from the first side to the second side, and the second positioning structure is a positioning block matched with the positioning hole.

16. The gas generating device of claim 15, wherein the first positioning structure and the second positioning structure are configured such that a plurality of the vent holes of a plurality of the tablets are enabled to communicate with each other to form a passage for gas circulation, with the plurality of the tablets in a stacked state through positioning and cooperating of the first positioning structure and corresponding second positioning structure, and peripheries of the plurality of the tablets are located on a same cylindrical surface.

17. The gas generating device of claim 14, wherein the ignition tablets are each stacked in the first accommodating groove through cooperation of the first positioning structure and the second positioning structure, and the gas generating tablets are each stacked in the second accommodating groove through cooperation of the first positioning structure and the second positioning structure.

18. The gas generating device of claim 16, wherein the first accommodating groove and/or the second accommodating groove are provided with a plurality of partition plates configured for dividing the first accommodating groove and/or the second accommodating groove into a plurality of sub accommodating grooves.

19. The gas generating device of claim 17, wherein the gas generating assembly further comprises a first elastic element, and the first elastic element is disposed at a side of the first accommodating groove close to the igniter.

* * * * *